US008880255B2

(12) United States Patent
Heap et al.

(10) Patent No.: US 8,880,255 B2
(45) Date of Patent: Nov. 4, 2014

(54) METHOD AND APPARATUS TO STABLIZE SELECTION OF OPERATING STATES USING ENERGY BASED STABLIZATION STRATEGY FOR HYBRID POWERTRAIN SYSTEMS

(75) Inventors: Anthony H. Heap, Ann Arbor, MI (US); Kee Yong Kim, Ann Arbor, MI (US); Samantha Victoria Lado, Pittsfield Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 82 days.

(21) Appl. No.: 13/571,029

(22) Filed: Aug. 9, 2012

(65) Prior Publication Data
US 2014/0046521 A1    Feb. 13, 2014

(51) Int. Cl.
*B60K 17/06*    (2006.01)
(52) U.S. Cl.
USPC ............................................. 701/22; 701/54
(58) Field of Classification Search
USPC ...................................................... 701/22, 54
See application file for complete search history.

(56) References Cited

U.S. PATENT DOCUMENTS

| 2005/0182546 A1* | 8/2005 | Hsieh et al. ..................... 701/54 |
| 2007/0078580 A1* | 4/2007 | Cawthorne et al. ............. 701/51 |
| 2009/0118949 A1* | 5/2009 | Heap et al. ..................... 701/55 |

* cited by examiner

*Primary Examiner* — Mary Cheung
*Assistant Examiner* — Yuen Wong (57) ABSTRACT

A method for stabilizing selection between a plurality of operating range states of an electro-mechanical transmission configured to transfer torque among an engine, at least one electric machine, and a driveline includes requesting execution of a shift from a first operating range state to a second operating range state. Costs associated with operating the transmission in each of the plurality of operating range states including the first and second operating range states are monitored and an energy differential between the first and second operating range states is determined based on the monitored costs. The shift from the first operating range state to the second operating range state is executed only if the energy differential achieves an integration threshold.

9 Claims, 4 Drawing Sheets

METHOD AND APPARATUS TO STABLIZE SELECTION OF OPERATING STATES USING ENERGY BASED STABLIZATION STRATEGY FOR HYBRID POWERTRAIN SYSTEMS

TECHNICAL FIELD

This disclosure is related to multi-mode powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion electric machines. The non-combustion electric machines may include electric machines that are operative as motors or generators to generate a torque input to the transmission independently of a torque input from the internal combustion engine. The electric machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

Known transmission devices employ torque-transfer clutch devices to transfer torque between the engine, the electric machines and the driveline. Operation of a powertrain system includes activating and deactivating the clutches to effect operation in selected operating states.

SUMMARY

A method for stabilizing selection between a plurality of operating range states of an electro-mechanical transmission configured to transfer torque among an engine, at least one electric machine, and a driveline includes requesting execution of a shift from a first operating range state to a second operating range state. Costs associated with operating the transmission in each of the plurality of operating range states including the first and second operating range states are monitored and an energy differential between the first and second operating range states is determined based on the monitored costs. The shift from the first operating range state to the second operating range state is executed only if the energy differential achieves an integration threshold.

BRIEF DESCRIPTION OF THE DRAWINGS

One or more embodiments will now be described, by way of example, with reference to the accompanying drawings, in which.

DETAILED DESCRIPTION

Figure 1:
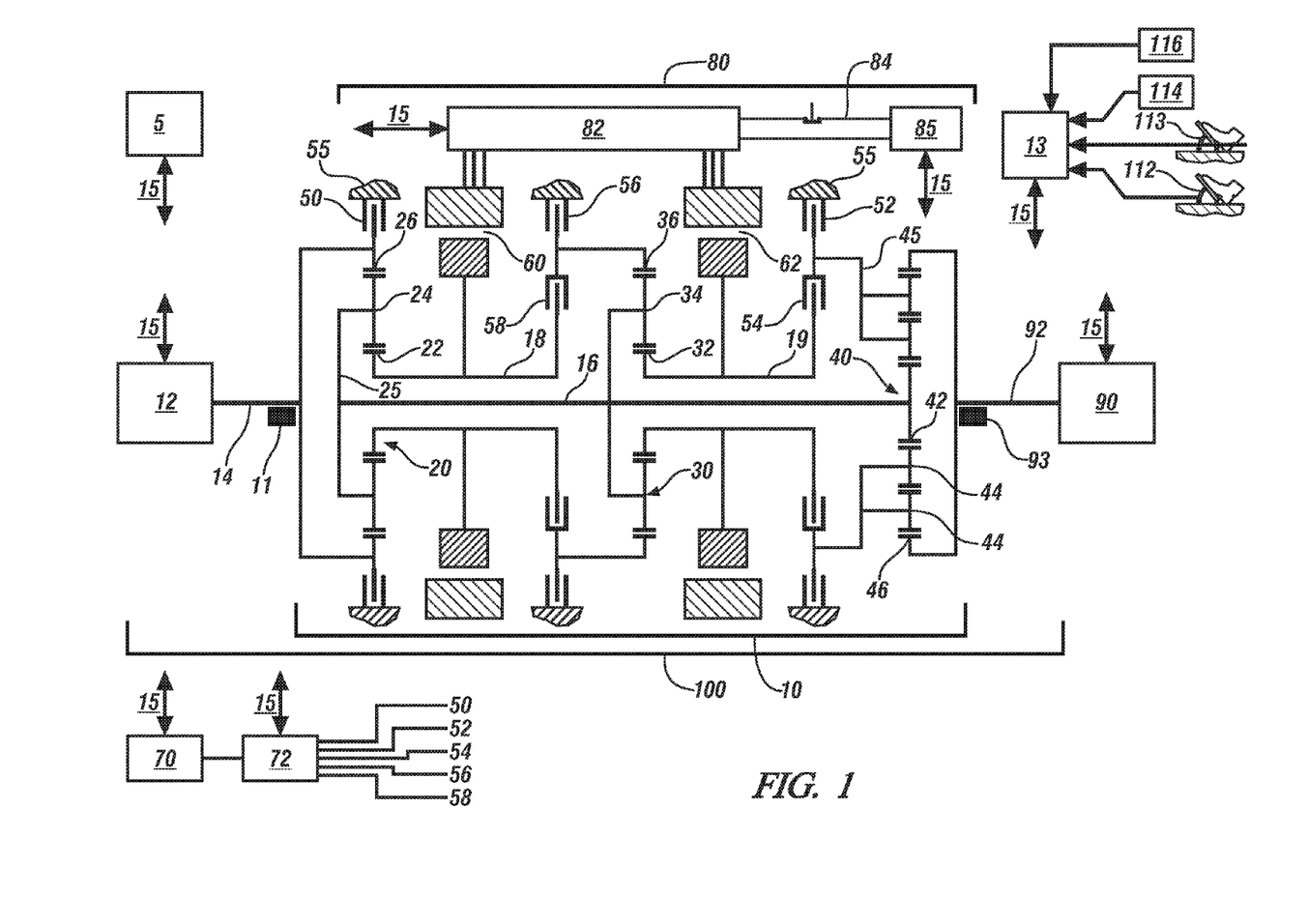
FIG. 1 illustrates a multi-mode powertrain system including an internal combustion engine, transmission, driveline, and a controller, in accordance with the present disclosure.

Referring now to the drawings, wherein the showings are for the purpose of illustrating certain exemplary embodiments only and not for the purpose of limiting the same, FIG. 1 depicts a non-limiting powertrain system 100 including an internal combustion engine (engine) 12, a multi-mode electro-mechanical transmission (transmission) 10, a high-voltage electrical system 80, a driveline 90, and a control module 5. The transmission 10 mechanically couples to the engine 12 and first and second electric machines 60, 62, respectively, and is configured to transfer torque between the engine 12, the electric machines 60, 62, and the driveline 90. As illustrated, the first and second electric machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 may be any suitable combustion device, and includes a multi-cylinder internal combustion engine selectively operative in several states to transfer torque to the transmission 10 via an input member 14, and can be either a spark-ignition or a compression-ignition engine. The engine 12 includes a crankshaft coupled to the input member 14 of the transmission 10. A rotational speed sensor 11 monitors crank angle and rotational speed of the input member 14.

Power output from the engine 12, i.e., rotational speed multiplied by engine torque, can differ from the input speed and the input torque to the transmission 10 due to placement of torque-consuming components on the input member 14 between the engine 12 and the transmission 10, e.g., a torque management device. The engine 12 is configured to execute autostop and autostart operations during ongoing powertrain operation in response to operating conditions. The control module 5 is configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second electric machines 60, 62, respectively.

The illustrated transmission 10 is a four-mode, compound-split, electro-mechanical transmission 10 that includes three planetary-gear sets 20, 30, and 40, and five engageable torque-transferring devices, i.e., clutches C1 52, C2 54, C3 56, C4 58, and C5 50. Other embodiments of the transmission are contemplated. The transmission 10 couples to first and second electric machines 60, 62, respectively. The transmission 10 is configured to transfer torque between the engine 12, the electric machines 60, 62, and the output member 92 in response to an output torque request. The first and second electric machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, band clutches, and brakes. A hydraulic circuit 72 is configured to control clutch states of each of the clutches, with pressurized hydraulic fluid supplied by an electrically-powered hydraulic pump 70 that is operatively controlled by the control module 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the control module 5 to activate and deactivate the aforementioned clutches, provide hydraulic fluid for cooling and lubricating elements of the transmission, and provide hydraulic fluid for cooling the first and second electric machines 60 and 62. Hydraulic pressure in the hydraulic circuit 72 may be determined by measurement using pressure sensor(s), by estimation using on-board routines, or using other suitable methods.

The first and second electric machines 60, 62, respectively, are three-phase AC motor/generator machines, each including a stator, a rotor, and a resolver. The motor stator for each of the electric machines 60, 62 is grounded to an outer portion of the transmission case 55, and includes a stator core with coiled electrical windings extending therefrom. The rotor for the first electric machine 60 is supported on a hub plate gear that mechanically attaches to sleeve shaft 18 that couples to the first planetary gear set 20. The rotor for the second electric machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second electric machines 60, 62, respectively. Additionally, the signals output from the resolvers may be used to determine rotational speeds for first and second electric machines 60, 62, respectively.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second electric machines 60, 62, respectively, are generated as a result of energy conversion from fuel or electrical potential stored in the electrical energy storage device (ESD) 85. The ESD 85 is high voltage DC-coupled to the TPIM 82 via the high-voltage electrical bus 84 that preferably includes a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second electric machines 60, 62, respectively, by switching at high frequencies. The insulated gate bipolar transistors form a switch mode power supply configured to receive control commands. There is a pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 60, 62, respectively, for operation as motors or generators via transfer conductors. The TPIM 82 transfers electrical power to and from the first and second electric machines 60, 62, respectively, through the power inverters and respective motor control modules in response to the motor torque commands. Electrical current is transmitted across the high-voltage electrical bus 84 to and from the ESD 85 to charge and discharge the ESD 85.

The control module 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second electric machines 60, 62, respectively. The control module 5 is a subset of an overall vehicle control architecture, and provides coordinated system control of the powertrain system. The control module 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain 100 is configured to operate in one of a plurality of powertrain states, including a plurality of transmission ranges and engine states to generate and transfer torque to the driveline 90. The engine states include an on state, an off state, and a fuel cutoff state. When the engine operates in the off state, it is unfueled, not firing, and is not spinning. When the engine operates in the on state it is fueled, firing, and spinning. When the engine operates in the fuel cutoff state, it is spinning but is unfueled and not firing. The transmission ranges include a plurality of neutral (neutral), fixed gear (Gear #), variable mode (EVT Mode #), electric vehicle (EV#) and transitional (EV Transitional State# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges are primarily employed as intermediate transmission ranges during shifts between EVT Mode ranges. Table 1 depicts a plurality of transmission ranges and engine states for operating the powertrain 100.

TABLE 1

| Range | Engine State | C1 | C2 | C3 | C4 | C5 |
|---|---|---|---|---|---|---|
| Neutral 1 | on/off | | | | | |
| Neutral 2 | on/off | | | x | | |
| Neutral 3 | on/off | | | | x | |
| PseudoGear 1 | on/off | x | | | | |
| PseudoGear 2 | on/off | | x | | | |
| Neutral | off | | | | | x |
| EVT Mode 1 | on/off | x | | x | | |
| EVT Mode 2 | on/off | x | | | x | |
| EVT Mode 3 | on/off | | x | | x | |
| EVT Mode 4 | on/off | | | x | x | |
| EV Transitional State 1 | off | x | | | | x |
| EV Transitional State 2 | off | x | | | | x |
| Gear 1 | on | x | | x | x | |
| Gear 2 | on | x | x | | x | |
| Gear 3 | on | | x | x | x | |
| EV1 | off | x | | x | | x |
| EV2 | off | x | | | x | x |
| EV3 | off | | x | | x | x |
| EV4 | off | | x | x | | x |
| EV Transitional State 3 | off | x | x | | | x |
| Neutral | on/off | | | x | x | |
| PseudoGear 3 | on/off | x | x | | | |
| Neutral | off | | | x | | x |
| Neutral | off | | | | x | x |

Figure 2:
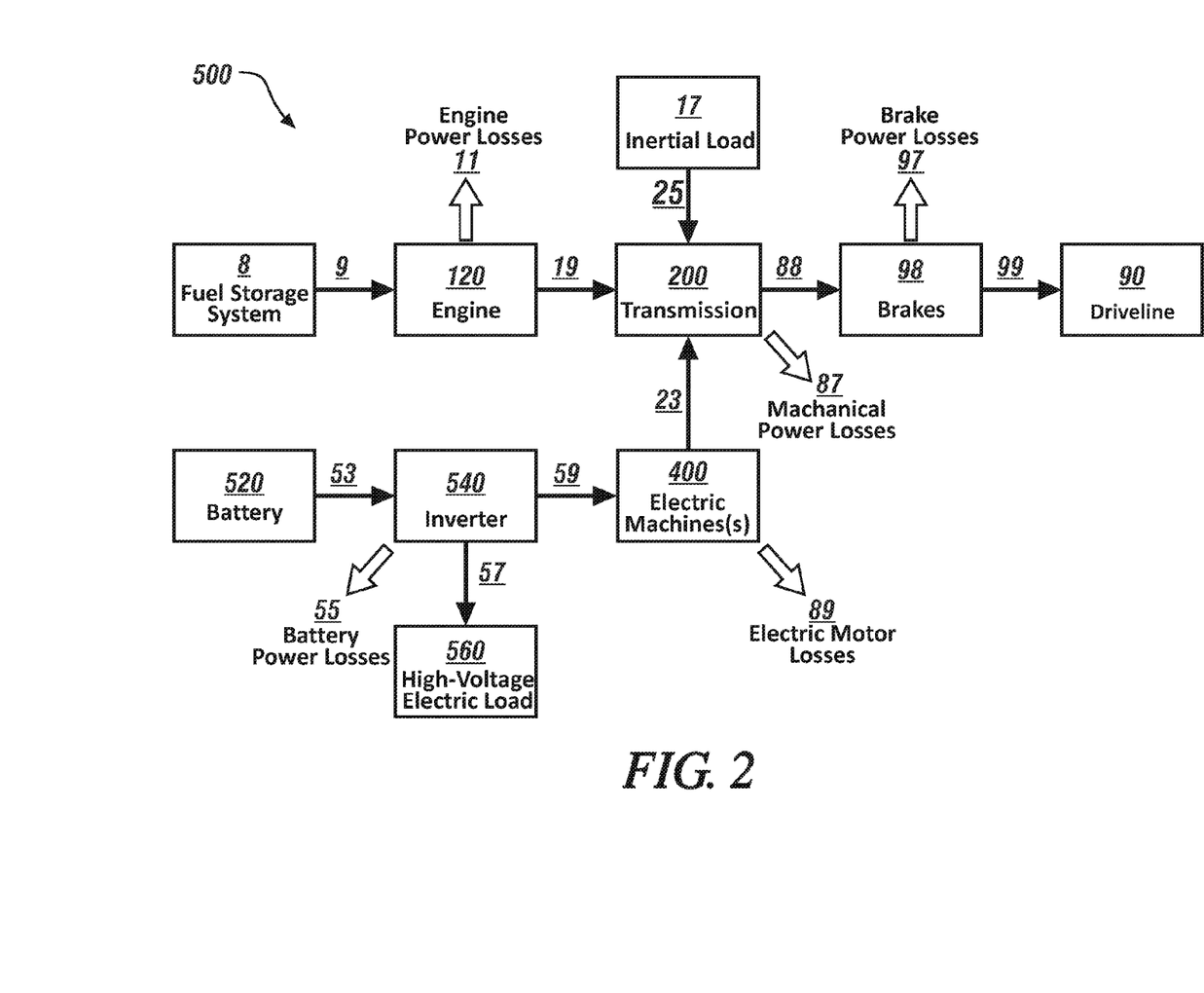
FIG. 2 illustrates an analytic framework for determining powertrain system operating costs for an exemplary power cost function 500, which is described with reference to the multi-mode powertrain system 100 described with reference to FIG. 1, in accordance with the present disclosure.

FIG. 2 schematically illustrates an analytic framework for determining powertrain system operating costs for an exemplary power cost function 500, which is described with reference to the multi-mode powertrain system 100 described with reference to FIG. 1. Powertrain elements include engine 120, transmission 200, non-combustion electric machine(s) 400, battery 520, inverter 540, wheel brakes 98, driveline 90, and a fuel storage system 8. Pseudo-elements include an inertial load 17, which is an element constructed to account for system inertias, and high-voltage electrical load 560, which is an element constructed to account for high-voltage loads in the vehicle outside that load used for the powertrain system 100. Power flow paths include a first power flow path 9 from the fuel storage system 8 to transfer fuel power to the engine 120, a second power flow path 19 between the engine 120 and the transmission 200, a third power flow path 53 between the battery 520 and the inverter 540, a fourth power flow path 57 between the inverter 540 and the high-voltage electrical load 560, a fifth power flow path 59 between the inverter 540 and the non-combustion electric machine(s) 400, a sixth power flow path 23 between the non-combustion electric machine(s) 400 and the transmission 20, a seventh power flow path 25 between the inertial load 17 and the transmission 200, an eighth power flow path 88 between the transmission 200 and the wheel brakes 98, and a ninth power flow path 99 between the wheel brakes and the driveline 90. Power losses include engine power losses 11, battery power losses 55, mechanical power losses 87, electric motor losses 89, and brake power losses 97. A total power cost can include a sum of the engine power losses 11, the battery power losses 55, the mechanical power losses 87, electric motor losses 89 and brake power losses 97. The power cost inputs to the power cost function 500 are determined based upon factors related to vehicle drivability, fuel economy, emissions, and battery usage. Power costs are assigned and associated with fuel and electrical power consumption and are associated with a specific operating points of the multi-mode powertrain. Lower operating costs can be associated with lower fuel consumption at high conversion efficiencies, lower battery power usage, and lower emissions for each engine speed/load operating point, and take into account the candidate operating state of the engine 14. The power costs may include the engine power losses 11, electric motor power losses 89, battery power losses 55, brake power losses 97, and mechanical power losses 87 associated with operating the multi-mode powertrain at specific operating points for the engine 100 and the non-combustion electric machine(s) 400. Subjective costs can be monitored to include, but not limited to, torque request costs, battery state of charge costs and output speed costs. The power cost function 500 may be employed to determine a total cost for operating at a selected engine operating point over the range of engine operation. Accordingly, a total cost can include the sum of the subjective costs, engine power losses 11, the battery power losses 55, the mechanical power losses 87, the electric motor losses 89, and the brake power losses 97 at any given operating range state.

Figure 3:
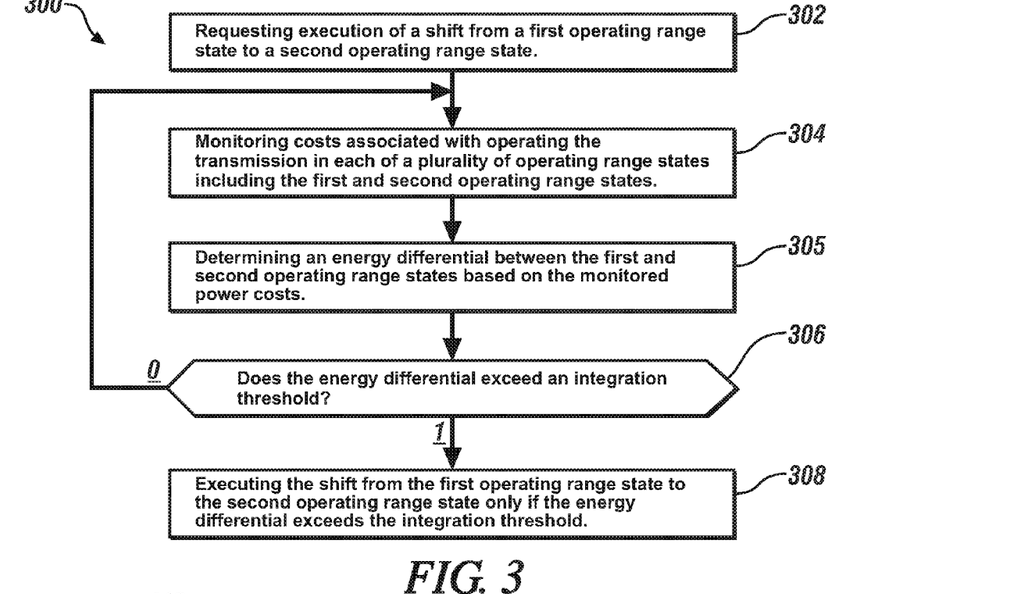
FIG. 3 illustrates a flowchart for stabilizing selection of operating range states utilizing an energy based stabilization strategy, in accordance with the present disclosure.

FIG. 3 illustrates an exemplary flowchart 300 for stabilizing selection between a plurality of operating range states of a multi-mode transmission in accordance with the present disclosure. Stabilizing selection between operating range states reduces shift business to increase drivability and fuel economy. The flowchart 300 is described with reference to the multi-mode powertrain system 100 illustrated in FIG. 1. The flowchart 300 can be implemented within the control module 5. Table 2 is provided as a key to FIG. 3, wherein the numerically labeled blocks and the corresponding functions are set forth as follows.

TABLE 2

| BLOCK | BLOCK CONTENTS |
|---|---|
| 302 | Requesting execution of a shift from a first operating range state to a second operating range state. |
| 304 | Monitoring costs associated with operating the transmission in each of a plurality of operating range states including the first and second operating range states. |
| 305 | Determining an energy differential between the first and second operating range states based on the monitored power losses. |
| 306 | Does the energy differential exceed an integration threshold? |
| 308 | Executing the shift from the first operating range state to the second operating range state only if the energy differential exceeds the integration threshold |

The flowchart 300 begins at block 302. In a first embodiment, block 302 requests execution of a shift from a first operating range state to a second operating range state. The requesting execution of the shift from the first operating range state to the second operating range state may be in response to an operator torque request, e.g., an operator input to the accelerator pedal 112 and monitored by the user interface 13 and the control module 5 via the communications link 15. However, requesting execution of the shift is not limited to operator torque requests. The first operating range state can include a current operating range state and the second operating range state can include an available operating range state that is determined a desired operating range state. The second operating range state has a lower cost associated with operating the transmission than the first operating range state. With reference to Table 1, the first and second operating range states each include one of a neutral range state, a pseudo gear state, a fixed gear range state (Gears 1-3), a variable mode range state (EVT modes 1-4) and an electrical vehicle range state (EV 1-4).

In a second embodiment, block 302 detects a potential shift from a current operating range state to one of a plurality of available operating range states. Available operating range states having a lower cost than a current operating range state can be referred to as preferred operating range states.

Referring to block 304, the flowchart 300 monitors costs associated with operating the transmission in each of a plurality of operating range states including the first and second operating range states. In the second embodiment, block 304 monitors costs associated with operating the transmission in each of the current and the available operating range states. The monitored costs can include a total cost that includes monitoring a sum of subjective costs, engine power losses 11, the battery power losses 55, the mechanical power losses 87, electric motor losses 89 and brake power losses 97 associated with operating the transmission 10 in the first (e.g., current) operating range state. Likewise, the monitored costs can include a total loss that includes the sum of subjective costs, engine power losses 11, the battery power losses 55, the mechanical power losses 87, electric motor losses 89 and brake power losses 97 associated with operating the transmission 10 in the second (e.g., desired) operating range state.

Referring to block 305, the flowchart 300 determines an energy differential between the first and second operating range states based on the monitored costs. Block 305 first utilizes a cost differential between the monitored cost of the first operating range state and the monitored cost of the second operating range state. In the first embodiment, the cost differential is calculated based on the difference between the monitored cost of the first operating range state and the monitored cost of the second operating range state. In the second embodiment, a cost differential between the current operating range state and each of the available operating range states is determined. The energy differential between the first and second operating range states is determined by integrating the cost differential. Likewise, each of the cost differentials between the current operating range state and each of the available operating range states can be expressed as a cost differential over time. Integrating the cost differential can be expressed in accordance with the following relationship.

$$E_{dif} = \int P_{dif} dt \qquad [1]$$

wherein
$E_{dif}$ is the energy differential, and
$P_{dif}$ is the cost differential.

Therefore, the energy differential is the cost differential between the first (e.g., current) and second (e.g., desired) operating range states over time. In a non-limiting embodiment, the $P_{dif}$ is expressed in kilowatts (kW) and the $E_{dif}$ is expressed in kilowatt-second (kW*sec). The flowchart 300 proceeds to decision block 306 once the energy differential, $E_{dif}$, is determined.

Decision block 306 decides if the energy differential achieves an integration threshold in the first embodiment. Thus, the energy differential is compared to an integration threshold. The integration threshold is respective to the shift from the first operating range state to the second operating range state. Further, the integration threshold can be utilized to normalize the cost differential between the first and second operating range states. A "0" indicates the energy differential does not exceed the integration threshold and the flowchart 300 reverts back to block 304. A "1" indicates the energy differential exceeds the integration threshold and the flowchart 300 proceeds to block 308.

In the second embodiment, decision block 306 first monitors integration thresholds each associated with respective ones of the cost differentials between current operating range state and each of the available operating range states. Each of the cost differentials is normalized based on respective ones of the integration thresholds. Specifically, each cost differential is divided by respective ones of the integration thresholds and each of the normalized cost differentials is determined based on the dividing. Subsequently, decision block 306 determines if one of the available operating range states is associated with a normalized cost differential over time achieving a normalized threshold. It will be appreciated that the normalized threshold can represent the normalization of each of the respective integration thresholds and can include a value of 1. A "0" indicates that none of the available operating range states are associated with a normalized cost differential over time achieving the normalized threshold. And the flowchart 300 reverts back to block 304. A "1" indicates that one of the available operating range states is associated with a normalized cost differential over time achieving the normalized threshold and the flowchart 300 proceeds to block 308. Accordingly, a "1" determines the one of the available operating range states associated with the normalized cost differential over time first achieving the normalized threshold as the a desired operating range state. In a scenario when at least two available operating range states associated with normalized cost differentials over time simultaneously (e.g., at the same instant) achieve the normalized threshold, one of the at least two available operating range states associated with the normalized cost differential having a highest gradient is determined as the desired operating range state.

Referring to block 308, the shift from the first operating range state to the second operating range state is executed in the first embodiment. Specifically, the shift from the first operating range state to the second operating range state is executed only if the energy differential achieves the integration threshold. Similarly put, operation of the powertrain system 100 is continued in the first operating range state if the energy differential does not exceed the integration threshold. In the second embodiment, block 308 commands execution of the shift from the current operating range state to the desired operating range state. Specifically, execution of the shift from the current operating range state to the desired operating range state is executed only if the normalized cost differential over time associated with cost differential between the current operating range state and the available operating range state, i.e., determined as the desired operating range state in decision block 306, has achieved the normalized threshold. In other words, operation of the transmission in the current operating range state is continued unless one of the cost differentials over time achieves the normalized threshold.

Latching onto the first operating range state unless the energy differential achieves the integration threshold reduces shift business that would otherwise result every time a potential shift from a current operating range state to an available operating range state is detected. Likewise, over-stabilization in the current operating range state is also avoided by commanding execution of the shift to the desired operating range state when the energy differential achieves the integration threshold. Known methods execute shifts to the available operating range state only when a cost differential exceeds a power threshold, and thus, over-stabilization can occur when a relatively small cost differential between the current and desired operating range states occurs over a long period of time. It is appreciated that small cost differentials occurring over a long period of time can undesirably increase costs.

Figure 4:
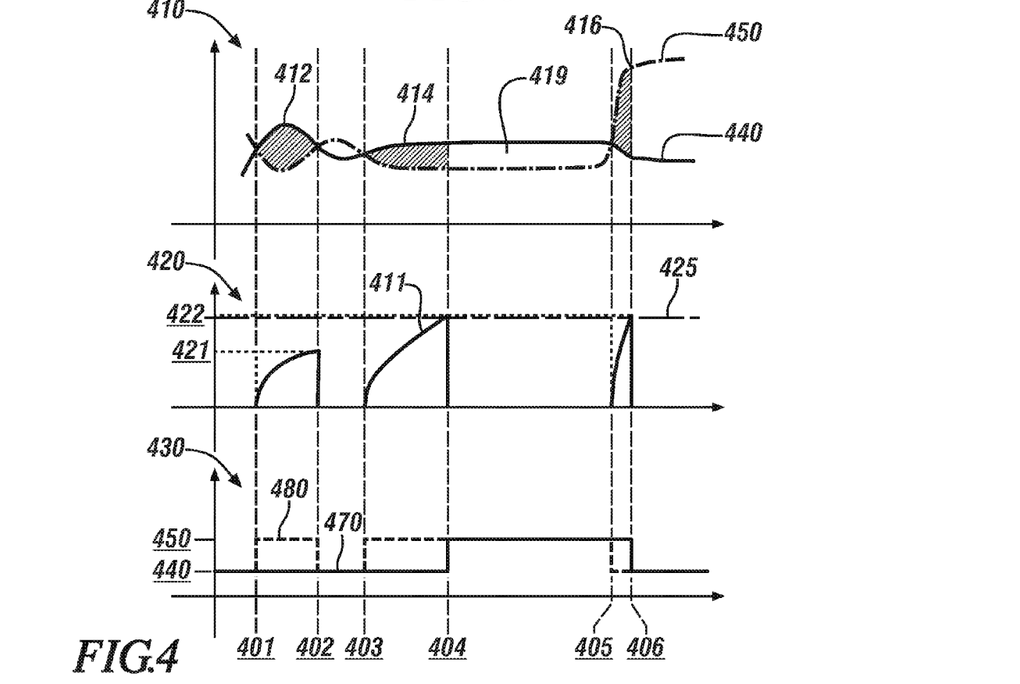
FIG. 4 illustrates an exemplary plot 410 describing monitored costs of first and second operating range states, an exemplary plot 420 describing an energy differential between the first and second operating range states and an exemplary plot 430 describing selection between the first and second operating range states, in accordance with the present disclosure.

FIG. 4 illustrates an exemplary plot 410 describing monitored costs of first and second operating range states, an exemplary plot 420 describing an energy differential between the first and second operating range states and an exemplary plot 430 describing selection between the first and second operating range states, in accordance with the present disclosure. The plots 410, 420, 430 contain experimental and derived data for stabilizing selection between a plurality of operating range states when execution of a shift from a first operating range state to a second operating range state is requested. The plots 410, 420, 430 are described with reference to the multi-mode powertrain system 100 described with reference to FIG. 1 and the flowchart 300 described with reference to FIG. 3. The horizontal axis in all three plots 410, 420, 430 denotes time in seconds. Each dashed vertical line 401, 402, 403, 404, 405, 406 extending through each of the plots 410, 420, 430 denotes a respective point in time during operation of the powertrain system 100.

Referring to plot 410, the vertical axis denotes cost corresponding to power in kilowatts (kW). The monitored cost associated with operating the transmission in the first operating range state is denoted by first cost profile 440. The monitored cost associated with operating the transmission in the second operating range state is denoted by second cost profile 450. As aforementioned, block 304 of flowchart 300 monitors costs associated with operating the transmission in each of the first and second operating range states. The cost differential at any given point in time can be determined based on the difference between the first and second cost profiles 440, 450, respectively. Area 412 represents a cost differential over time between dashed vertical lines 401 and 402. Area 414 represents a cost differential over time between dashed vertical lines 403 and 404. Area 416 represents a cost differential over time between dashed vertical lines 405 and 406.

Referring to plot 420, the vertical axis denotes energy in kilowatts-second (kW*s). An energy differential between the first and second operating range states is denoted by energy differential profile 411 that extends from dashed vertical line 401 to beyond dashed vertical line 406. The energy differential between the first and second operating range states based on the monitored costs is determined in block 305 of flowchart 300. Specifically, the cost differential can be integrated to determine the energy differential between the first and second operating range states utilizing Eq. [1]. Accordingly, area 412 between dashed vertical lines 401 and 402 depicted in plot 410 is expressed as an energy differential having a first magnitude 421 of energy consumed between the first and second operating states at dashed vertical line 402. Area 414 between dashed vertical lines 403 and 404 depicted in plot 410 is expressed as an energy differential having a second magnitude 422 of energy consumed between the first and second operating states at dashed vertical line 404. Area 416 between dashed vertical lines 405 and 406 depicted in plot 410 is expressed as an energy differential having the second magnitude 422 of energy consumed between the first and second operating states at dashed vertical line 406.

Still referring to plot 420, segmented horizontal line 425 denotes an integration threshold. As aforementioned, decision block 406 compares the energy differential (e.g., energy differential profile 411) to the integration threshold 425. In an exemplary embodiment, a magnitude of the integration threshold is selected respective to the second operating range state. It is appreciated that the energy differential profile 411 at dashed vertical line 402 only reaches the first magnitude 421 of energy consumed, and therefore does not achieve the integration threshold 425. However, the energy differential profile 411 at each of dashed vertical lines 404 and 406 achieves the integration threshold.

Referring to plot 430, selection between the first and second operating range states 440, 450, respectively, is depicted to avoid over-stabilization based on the energy differential between the first and second operating range states 440, 450, respectively. Over-stabilization is used to describe the transmission latching onto a current operating range state and incurring relatively small costs over a long period time resulting in accumulated power losses or costs. The vertical axis denotes the first and second operating range states 440, 450, respectively. Solid profile line 470 depicts a selected one of the operating range states 440, 450, respectively. Dashed profile line 480 depicts an available one of the operating range states 440, 450, respectively.

Between dashed vertical lines 401 and 402, the second operating range state 450 is available as depicted by dashed profile line 480. In other words, a shift from the first operating range state to the second operating range would have been executed if integration was not performed. The second operating range state 450 is available as a preferred operating range state between lines 401 and 402 due to the monitored cost of the second operating range state 450 being less than the monitored cost of the first operating range state 440, as depicted in plot 410 between dashed vertical lines 401 and 402. However, operation of the powertrain system 100 is continued in the first operating range state because the energy differential (e.g., power cost differential over time) between the first and second operating range states does not exceed the integration threshold, as depicted by the first magnitude 421 of energy consumed not achieving the integration threshold 425 in plot 420 at dashed vertical line 402. It is appreciated that shift busyness is avoided between lines 401 and 402 even though the second operating range state 450 has a lower cost. Between dashed vertical lines 401 and 402, decision block 306 determines a "0" indicating that the energy differential at line 402 does not achieve the integration threshold and the flowchart 300 reverts back to block 304.

Between dashed vertical lines 403 and 404, the second operating range state 450 is available as a preferred operating range state as depicted by dashed profile line 480. However, operation of the powertrain system 100 is continued in the first operating range state between lines 403 and 404 because plot 420 shows the energy differential profile 411 (e.g., cost differential over time) between the first and second operating range states never achieves the integration threshold 425 until the dashed vertical line 404. Thus, shift busyness affecting drivability is avoided up until dashed vertical line 404.

At dashed vertical line 404, execution of the shift from the first operating range state to the second operating range state is executed. As shown in plot 420, the energy differential profile 411 having the second magnitude 422 of energy consumed achieves the integration threshold 425 at dashed vertical line 404. Therefore, at dashed vertical line 404, the decision block 306 determines a "1" indicating that the energy differential at line 404 achieves the integration threshold and the flowchart 300 proceeds to block 306, wherein the shift in the operating range state is executed.

The powertrain system 100 has selected and is operating in the second operating range state between dashed vertical lines 404 and 405. Area 419 between dashed vertical lines 404 and 405 depicted in plot 410 correlates to an energy savings that would have otherwise resulted in costs due to over-stabilization if the shift to the second operating range state was not selected. In other words, because the cost differential between the first and second operating range states is relatively low and remains constant, execution of a shift between dashed vertical lines 403 and 405 may not occur if shifting were only based on the monitored cost differential. However, the energy differential achieves the integration threshold at dashed vertical line 404 requiring execution of the shift, and therefore, energy savings incur between dashed vertical lines 404 and 405.

In the exemplary embodiment, the energy differential profile 411 is reset at dashed vertical lines 402 and 404 once it achieves the integration threshold 425. However, other exemplary embodiments can include negatively integrating, or "counting down" the energy differential profile 411, should the cost of the first operating range state 440 subsequently become less than the cost of the second operating range state 450.

Between dashed vertical lines 405 and 406, a shift from the second operating range state to the first operating range state has been requested while integration is being performed. Operation of the powertrain system 100 is continued in the second operating range state unless the energy differential (e.g., cost differential over time) between the first and second operating range states achieves the integration threshold. It is appreciated that if the cost differential between the first and second operating range states 440, 450, respectively, immediately exceeded the integration threshold, execution of the shift would occur immediately. At vertical line 406, the energy differential achieves the integration threshold as depicted by the second magnitude 422 of energy consumed exceeding the integration threshold 425 in plot 420 at dashed vertical line 402. Thus, execution of the shift from the second operating range state 450 to the first operating range state 440 occurs at dashed vertical line 406. Accordingly, stabilization is incurred between lines 405 and 406 while the powertrain latches onto the second operating range state until the energy differential exceeds the integration threshold at line 406, wherein the shift to the first operating range state 440 is executed to avoid over-stabilization.

Figure 5:
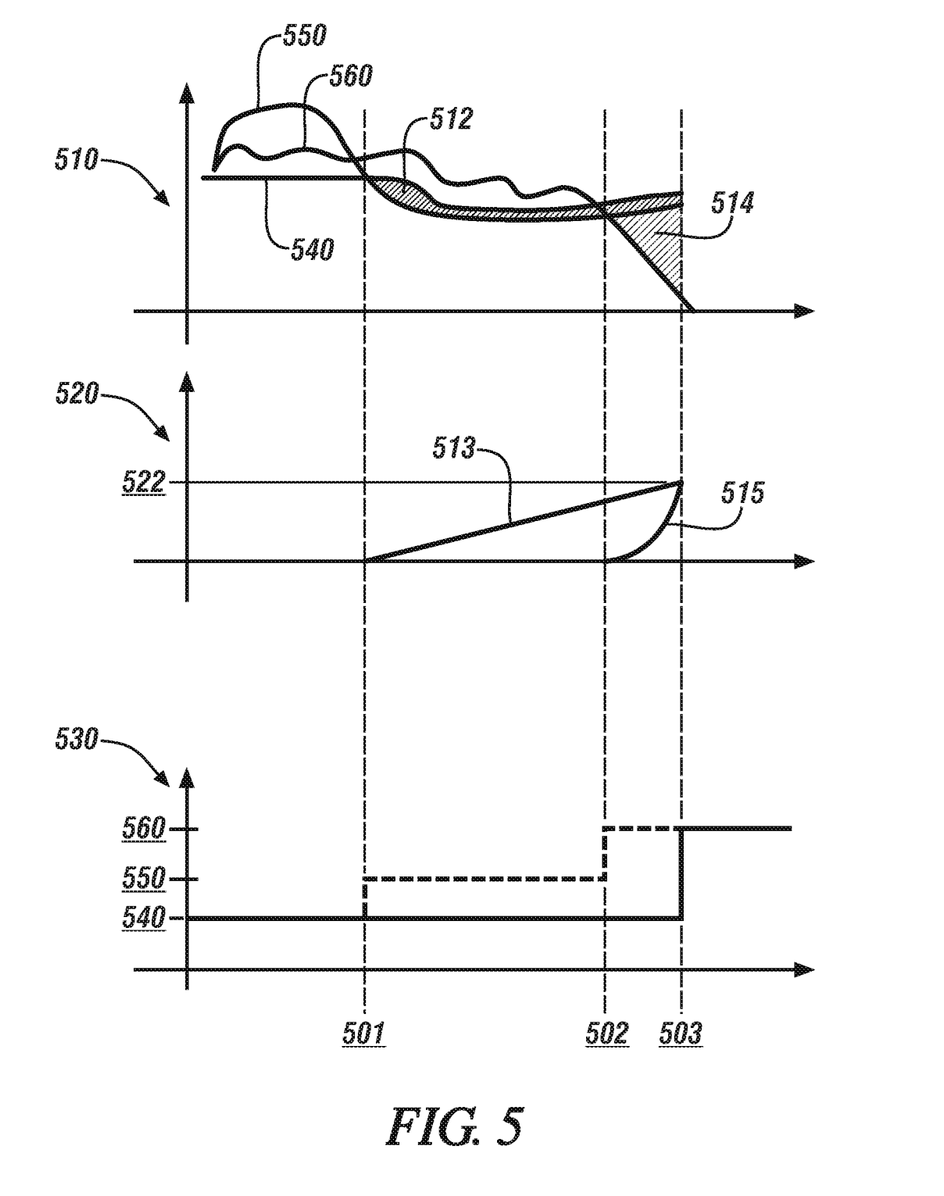
FIG. 5 illustrates an exemplary plot 510 describing monitored costs of a current and two available operating range states, an exemplary plot 520 describing a first energy differential between the current and one of the available operating range states and a second energy differential between the current and the other one of the available operating range states, and an exemplary plot 530 describing selection between the available operating range states, in accordance with the present disclosure.

FIG. 5 illustrates an exemplary plot 510 describing monitored costs of a current operating range state and first and second available operating range states, an exemplary plot 520 describing a first energy differential between the current and the first available operating range states and a second energy differential between the current and the second available operating range states and an exemplary plot 530 describing selection between the first and second available operating range states, in accordance with the present disclosure. The plots 510, 520, 530 contain experimental and derived data for stabilizing selection between a plurality of operating range states when execution of a shift from a first operating range state to a second operating range state is requested. The plots 510, 520, 530 are described with reference to the multi-mode powertrain system 100 described with reference to FIG. 1 and the flowchart 300 described with reference to FIG. 3. The horizontal axis in all three plots 510, 520, 530 denotes time in seconds. Each dashed vertical line 501, 502, 503 extending through each of the plots 510, 520, 530 denotes a respective point in time during operation of the powertrain system 100.

Referring to plot 510, the vertical axis denotes power in kilowatts (kW). The monitored cost associated with operating the transmission in the current operating range state is denoted by current cost profile 540. The monitored costs associated with operating the transmission in the first and second available operating range states are denoted by current cost profiles 550, 560, respectively. This disclosure is not limited to two available operating range states and can include any number of available operating range states. As aforementioned, block 304 (e.g., second embodiment) of flowchart 300 monitors costs associated with operating the transmission in each of a plurality of operating range states. The cost differential at any given point in time can be determined based on the difference between the current and first available operating range states 540, 550, respectively, and the difference between the current and the second available operating range states 540, 560, respectively. Area 512 represents a cost differential between the current and first available operating range states 540, 550, respectively, over time between dashed vertical lines 501 and 503. Area 514 represents a cost differential over time between the current and second available operating range states 540, 550, respectively, between dashed vertical lines 502 and 503. It will be understood that cost profile 550 denotes a "preferred" operating range state once the cost is less than the current cost profile 540, i.e., after dashed vertical line 501. It will be understood that cost profile 560 denotes an "preferred" operating range state once the cost is less than the current cost profile 540, i.e., after dashed vertical line 502.

In an exemplary embodiment, integration thresholds each associated with respective ones of the cost differentials between the current operating range state 540 and each of the available operating range states 550, 560, respectively, are monitored. Thus, a first integration threshold is respective to the cost differential between the current and first available operating range states 540, 550, respectively. Likewise, a second integration threshold is respective to the cost differential between the current and second available operating range state 540, 560, respectively. Each cost differential may be normalized based on respective ones of the integration thresholds. For instance, the cost differential between the current and the first available operating range states 540, 550, respectively, can be divided by the first integration threshold to determine a first normalized cost differential. Likewise, the cost differential between the current and the second available operating range states 540, 560, respectively, can be divided by the second integration threshold to determine a second normalized cost differential.

Referring to plot 520, the vertical axis denotes energy in kilowatts-second (kW-sec). An energy differential between the current and first available operating range states is denoted by energy differential profile 513 that extends from dashed vertical line 501 to dashed vertical line 503. In an exemplary embodiment, the energy differential profile 513 represents the first normalized cost differential over time. Specifically, the first normalized cost differential over time can be determined based on summing the first normalized cost differential to respective first normalized cost differentials from each previous iteration. An energy differential between the current and second available operating range states is denoted by energy differential profile 515 that extends from dashed vertical line 502 to dashed vertical line 503. In an exemplary embodiment, the energy differential profile 515 represents the second normalized cost differential over time. Specifically, the second normalized cost differential over time can be determined based on summing the second normalized cost differential to respective second normalized cost differentials from each previous iteration. Accordingly, area 512 between dashed vertical lines 501 and 503 depicted in plot 510 is expressed as the first normalized cost differential over time (i.e., profile 513 in plot 520) and area 514 between dashed vertical lines 502 and 503 depicted in plot 510 is expressed as the second normalized cost differential over time (i.e., profile 515 in plot 520).

Still referring to plot 520, horizontal line 522 denotes a normalized threshold. As aforementioned, decision block 306 compares the energy differential to the integration threshold. Accordingly, when a plurality of available operating range states have a lower cost than a current operating range state, a normalized threshold can be determined. Specifically, the normalized threshold can have a magnitude of 1 when each cost differential between the current operating range state and each of the available operating range states is normalized based on respective ones of integration thresholds. In other words, cost differentials over time achieving respective integration thresholds corresponds to normalized cost differentials achieving the normalized threshold having a magnitude of 1.

Referring to plot 530, selection between the current operating range state 540 and the first and second available operating range states 550, 560, respectively, is depicted. The vertical axis denotes the current operating range state 540 and the first and second available operating range states 550, 560, respectively. Dashed profile line depicts an available operating range state and solid profile line depicts a selected operating range state.

Between dashed vertical lines 501 and 503, the first available operating range state 550 is available. In other words, a potential shift from the current operating range state 540 to the first available operating range state 550 is detected. The first available operating range state 550 is available as a preferred operating range state between lines 501 and 503 due to the monitored cost of the first available operating range state 550 being less than the monitored cost of the current operating range state 540, as depicted in plot 510 between dashed vertical lines 501 and 503. In an exemplary embodiment, operation of the transmission in the current operating range state 540 is continued unless one of the cost differentials over time (e.g., energy differential profiles 513 and 515) achieves the normalized threshold 520 in plot 520. Hence, operation of the transmission in the current operating range state 540 is continued until dashed vertical line 503 because neither of the first and second normalized cost differentials over time 513, 515, respectively, achieves the normalized threshold 522, as depicted in plot 520. It is appreciated that shift busyness is avoided between dashed vertical lines 501 and 503 even though the first available operating range state 550 is preferred at dashed vertical line 501. Until dashed vertical line 503, decision block 306 determines a "0" indicating that the first normalized cost differential over time 513 has not achieved the normalized threshold 522.

Between dashed vertical lines 502 and 503, the second available operating range state 560 is available as a preferred operating range state. In other words, a potential shift from the current operating range state 540 to the second available operating range state 560 is detected. The second available operating range state 560 is available as a preferred operating range state between lines 502 and 503 due to the monitored cost of the second available operating range state 560 being less than the monitored cost of the current operating range state 540, as depicted in plot 510 between dashed vertical lines 502 and 503. It is appreciated that shift busyness is avoided between dashed vertical lines 502 and 503 even though the second available operating range state 560 is preferred at dashed vertical line 502. Until dashed vertical line 503, decision block 306 determines a "0" indicating that the second normalized cost differential over time 515 has not achieved the normalized threshold 522.

In an exemplary embodiment, one of the first and second available operating range states associated with the normalized cost differential over time first achieving the normalized threshold 522 is determined as a desired operating range state. The first and second normalized cost differentials over time 513, 515, respectively, each achieve the normalized threshold 522 at the time at dashed vertical line 503. As aforementioned in block 306, in the event that at least two normalized cost differentials over time achieve the normalized threshold simultaneously, the one normalized cost differential with the steeper gradient is selected as the desired operating range state. Accordingly, the second available operating range state associated with the second normalized cost differential over time 515 is selected as the desired operating range state. Thus, execution of the shift from the current operating range state 540 to the second available operating range state 560 (i.e., desired operating range state) is commanded and the second available operating range state 560 is selected at dashed vertical line 503.

FIG. 5 demonstrates that when a plurality of available operating range states exist, the available operating range state associated with the normalized cost differential over time first achieving the normalized threshold is determined as the desired operating range state. If at least two available operating range states achieve the normalized threshold simultaneously, the available operating range state associated with the normalized threshold over time having a highest gradient is determined as the desired operating range state. Thus, the available operating range state having the lowest cost among the plurality of available operating range states can be determined the desired operating range state, however, other operating range not having the lowest cost among the plurality of available operating range states can be determined the desired operating range state so long as the cost differential over time achieves the normalized threshold first.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for stabilizing selection between a plurality of operating range states of an electro-mechanical multi-mode transmission configured to transfer torque among an engine, at least one electric machine, and a driveline, the method comprising:
   a control module configured to execute the following steps, comprising:
      requesting execution of a shift from a first operating range state to a second operating range state;
      monitoring costs associated with operating the electro-mechanical multi-mode transmission in each of the plurality of operating range states including the first and second operating range states;
      determining an energy differential between the first and second operating range states based on the monitored costs; and
      executing the shift from the first operating range state to the second operating range state only if the energy differential achieves a predetermined integration threshold.

2. The method of claim 1 wherein executing the shift from the first operating range state to the second operating range state only if the energy differential achieves the integration threshold further comprises:
   continuing operation of the transmission in the first operating range state if the energy differential does not achieve the integration threshold.

3. The method of claim 1 wherein the first operating range state comprises a current operating range state and the second operating range state comprises a desired operating range state selected from among a plurality of available operating range states, the current operating range state having a higher cost associated with operating the transmission than the available operating range states.

4. The method of claim 3 wherein selecting the desired operating range state from among the plurality of available operating range states, comprises:
   determining a respective energy differential between each of the available operating range states and the first operating range state based on the monitored costs;
   monitoring respective integration thresholds each associated with respective ones of the energy differentials between the first operating range state and each of the available operating range states;
   selecting as a desired operating range state the available operating range state corresponding to the respective energy differential first achieving the respective integration threshold.

5. The method of claim 1 wherein the second operating range state comprises an operating range state having a lowest cost associated with operating the transmission from among a plurality of available operating range states.

6. The method of claim 1 wherein the first and second operating range states each comprise one of a neutral range state, a pseudo gear state, a fixed gear range state, a variable mode range state and an electrical vehicle range state.

7. The method of claim 1 wherein determining the energy differential between the first and second operating range states based on the monitored costs comprises:
   calculating a cost differential between the monitored cost of the first operating range state and the monitored cost of the second operating range state; and integrating the cost differential to determine the energy differential between the first and second operating range states.

8. The method of claim 7 wherein the cost differential is normalized based on the predetermined integration threshold.

9. The method of claim 1 wherein the predetermined integration threshold is respective to the shift from the first operating range state to the second operating range state.

* * * * *